Figure 1:
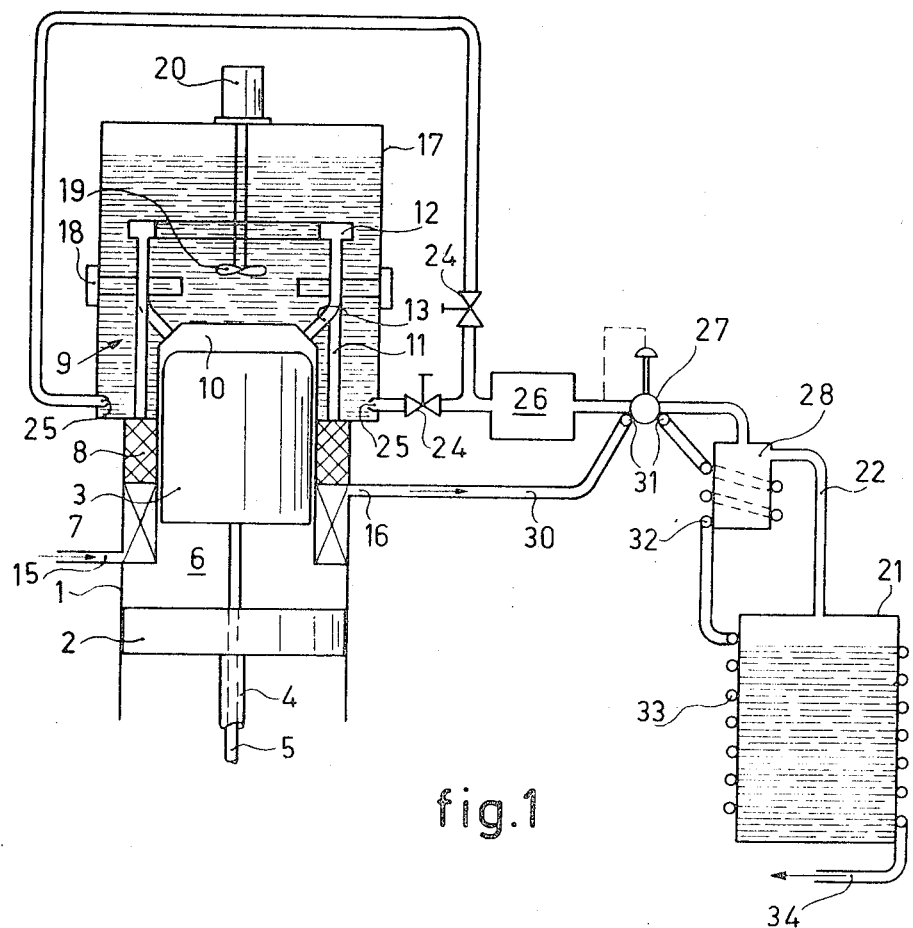

United States Patent
Schroder et al.

[15] 3,651,637
[45] Mar. 28, 1972

[54] HOT GAS ENGINE

[72] Inventors: Johann Schroder, Aachen, Germany; Roland Anton Johan Otto Van Witteveen, Emmasingel, Eindhoven, Netherlands

[73] Assignee: U.S. Philips Corporation, New York, N.Y.

[22] Filed: Sept. 25, 1969

[21] Appl. No.: 860,992

[30] Foreign Application Priority Data

Sept. 30, 1968 Netherlands..........................6813986

[52] U.S. Cl. ............................................................60/24
[51] Int. Cl. ..........................................................F03g 7/06
[58] Field of Search ...................................60/23–25, 36, 37

[56] References Cited

UNITED STATES PATENTS 3,353,349  11/1967  Percival................................60/24 X
3,418,804  12/1968  Meijer...................................60/37 X Primary Examiner—Martin P. Schwadron
Assistant Examiner—Allen M. Ostrager
Attorney—Frank R. Trifari

[57] ABSTRACT

Apparatus for converting heat energy into mechanical energy, particularly a hot-gas engine, in which a working medium performs a cycle between an expansion space of higher temperature and a compression space of lower temperature, there being provided a heating system for supplying heat to the expansion space and a cooler for conducting away heat form the compression space. The heating system includes a reaction vessel containing a metal mixture heatable to a liquid phase and an oxydizing agent reservoir containing the oxydizing agent in the liquid phase, the oxydizing agent being supplied in a dosed gaseous form to the reaction vessel for exothermic reaction with the metal. The cooling water is passed from the cooler to the reservoir to provide heat from partially evaporating the liquid oxydizing agent therein.

10 Claims, 2 Drawing Figures

Patented March 28, 1972

3,651,637

2 Sheets-Sheet 2

INVENTORS
JOHANN SCHRÖDER
ROLAND A.J.O. VAN WITTEVEEN
BY

AGENT

HOT GAS ENGINE

The invention relates to a device for converting caloric energy into mechanical energy, particularly to a hot-gas engine comprising at least one space of lower average temperature, in which a working medium can be compressed, and at least one space of higher average temperature communicating with the former, in which the working medium can expand. The connection between each pair of said spaces includes a heat exchanger, preferably a regenerator through which the working medium can flow reciprocally absorbing heat on its path from the compression space to the expansion space and giving off heat in the reverse direction. There is furthermore provided a cooler having a coolant inlet and a coolant outlet for withdrawing heat from the working medium contained in that portion of the device which is located on the side of said heat exchanger facing the compression space and a heating system for supplying heat to the working medium contained in that portion of the device which is located on the side of said heat exchanger facing the expansion space. The heating system comprises at least one reaction vessel containing a metal or metal mixture which is liquid at the operational temperature and at least one reservoir of a liquefied oxydizing agent capable of reacting chemically with the liquid in the reaction vessel while developing heat so that the reaction products are solid and/or liquid at the temperature and pressure prevailing in the reaction vessel. The reservoir communicates through at least one supply duct with the reaction vessel, there being provided a control-member for supplying regulated quantities of the oxydizing agent to the reaction vessel.

In known devices of the kind set forth which may not only be hot-gas engines but also gas turbines, a working medium performs a thermodynamic cycle. The working medium is compressed at a low temperature in a compression space and then at a high temperature it expands in an expansion space. In order to maintain a sufficiently low temperature in the compression space, a cooler traversed by a coolant, withdraws heat from the working medium, whereas heat is supplied to the working medium for maintaining the temperature of the medium in the expansion space by means of a heating system. The heating system employed in the present device is remarkable in being capable of supplying heat independently of the surroundings of the device. This means that this heating system supplies heat without consuming combustion air and without producing flue gases. The device embodying the present invention is therefore particularly suitable for use at places where no air is available and/or at places where pollution of air by flue gases is not permissible.

The metal or metal mixture in the reaction vessel may be formed by one or more of the metals Li, Na, K, Mg, Al and/or one or more of the rare earth metals. These metals and particularly combinations thereof have the advantage of a comparatively low melting point and of a great development of heat per unit of volume. The oxydizing agent may be formed by a halogen or a halide, particularly a fluorine compound, which can be liquefied by pressure at room temperature. The oxydizing agent is supplied in the gaseous form in regulated quantities to the reaction vessel, in which it reacts with the metal while developing heat, there being formed salts which are solid and/or liquid at the operational temperature.

It is known to store the oxydizing agent in the liquid phase in the reservoir, the vapor pressure being sufficiently high to cause the oxydizing agent to flow in the gaseous phase to the reaction vessel. In order to maintain the desired vapor pressure, the delivered vapour has to be replaced by a given quantity of evaporated liquid. For this purpose heat has to be supplied. Since the vapour pressure of the most appropriate kinds of oxydizing agent, even at 0° C. is still sufficiently high for causing the vapor to flow by means of its own pressure to the reaction vessel, the required heat might be obtained directly from the ambient air or, if the device serves for propelling a ship, from the surrounding water. However, difficulties may arise under given conditions, which may disturb the supply of heat. If, for example, the ambient temperatures is hear 0° C., ice may be deposited on the heat exchange faces; the medium supplying heat (air or water) will be cooled, so that the water or the moisture of the air is frozen. This would strongly reduce the transfer of heat to the oxydizing agent, so that the vapor pressure would drop and no gaseous oxydizing agent would any longer flow into the reaction vessel. Due to any fluctuations of the ambient temperature also the temperature and hence the vapour pressure of the oxydant will vary, which is extremely disadvantageous for the regulation of the supply of oxydizing agent to the reaction vessel.

The invention has for its object to provide a device for converting caloric energy into mechanical energy, in which the problems depicted above are completely obviated. The device embodying the invention is therefore characterized in that the outlet duct of the cooler is provided with at least one duct to which at least part of the coolant can be supplied and which is in thermal contact with the reservoir containing the liquefied oxydizing agent.

The coolant absorbs the thermal loss of the cooler inherent to the thermodynamic cycle of the working medium and has therefore a higher temperature. By causing this coolant to come into thermal contact with the liquid oxydizing agent, a sufficient quantity of heat can be supplied to the oxydizing agent readily by means of a very simple heat exchanger without a risk of freezing of the coolant on the heat exchange faces. It is a further advantage that the temperature of the oxydizing agent will exhibit less fluctuation so that the control of the supply to the reaction vessel can be performed in a simpler and better manner.

A further appreciable aspect is that, when the device supplies higher power and therefore more heat has to be supplied to the expansion space and a larger quantity of oxydizing agent has to be supplied, which requires a higher rate of evaporation, the thermodynamic cycle gives off more heat to the coolant; this heat is again available to achieve the required higher rate of evaporation. Therefore, also in the control of power the vapor pressure of the oxydizing agent will vary to a lesser extent than in the case of heating independently of the engine load.

In a further advantageous embodiment of the invention each of the supply ducts communicating with the oxydizing agent reservoir includes a reduction valve and a liquid separator between said valve and the reservoir concerned. Each of said ducts traversed by the coolant prior to its thermal contact with the oxydizing agent reservoir concerned is in thermal contact with the associated reduction valve and the liquid separator. As a result thereof a constant temperature or a higher temperature will prevail at the reduction valve and the liquid separator than in the associated oxydizing agent reservoir so that the vapor formed in the reservoir is not likely to condense in the liquid separator or in the reduction valve.

Figure 2:
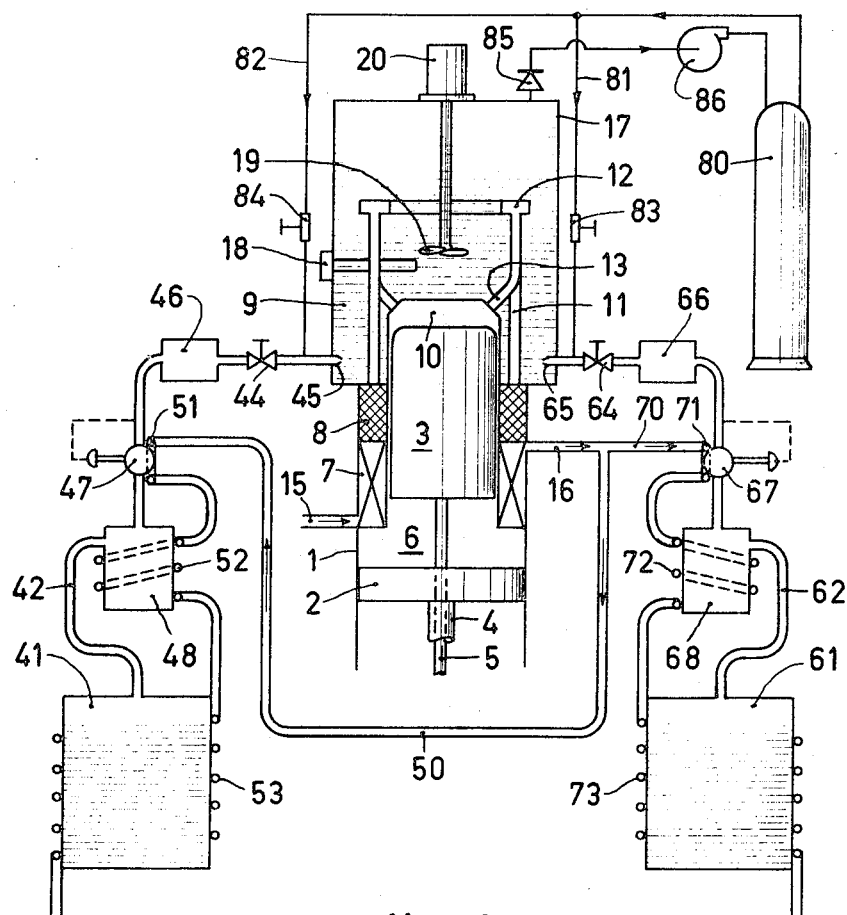

The invention will be described more fully with reference to the drawing, in which FIGS. 1 and 2 show schematically and not to scale two embodiments of a device, formed by a hot-gas engine, for converting heat energy into mechanical energy with the associated heating system.

Referring to FIG. 1, reference numeral 1 designates a cylinder, in which a piston 2 and a displacer 3 are adapted to move. The piston 2 and the displacer 3 are connected by a piston rod 4 and a displacer rod 5 respectively with a driving gear (not shown). Between the piston 2 and the displacer 3 a compression space 6 communicates through a cooler 7, a regenerator 8 and a heater 9 with an expansion space 10. The heater is formed by a tubular heater consisting of a crown of pipe 11, communicating with the regenerator 8 and at the other end with an annular channel 12, and a crown of pipes 13 connecting the annular channel 12 with the expansion space 10. The cooler 7 has an inlet 15 and an outlet 16 for coolant. The heater 9 is arranged in a reaction vessel 17, which is filled with a mixture of mainly Li and Ca, above which an inert gas is provided for maintaining pressure on the metal mixture. The vessel 17 accommodates furthermore an electric heating device 18 for melting the metal, there being provided an agitator 19, coupled with an electric motor 20, for causing the metal melt to circulate along the heater pipes 11 and 13.

A reservoir 21 contains as an oxydant sulphur hexafluoride ($SF_6$) in the liquid phase. On the upper side the reservoir 21 communicates with a duct 22 including a liquid separator 28. The duct 22 communicates at the other end through each of the control-cocks 24 with a plurality of outlet nozzles 25, only one of which is shown at each cock 24 for the sake of clarity, said outlet nozzles opening out in the vessel 17. Between the liquid separator 28 and the cocks 24 the duct 22 includes a reduction valve 27 and a buffer vessel 26.

With the outlet 16 of the cooler 7 communicates a duct 30, which is at 31 and 32 in thermal contact with the reduction valve 27 and the liquid separator 28 respectively. At 33 the duct 30 exchanges heat with the reservoir 21.

The device described operates as follows: By means of the heating device 18 the metal mixture in the vessel 17 is caused to melt. Then the control-valves 24 are opened and vaporous $SF_6$ flows through the outlet pieces 25 into the vessel 17, where it reacts with the metal while developing heat. The developed heat is transferred to the heater 9. The supplied heat is converted by the hot-gas engine in which the working medium performs a thermodynamic cycle, into mechanical energy, which is passed by the piston rod 4 to a driving gear (not shown). The working medium absorbs heat in the heater 9, whereas in the cooler 7 the working medium gives off heat to the coolant which is supplied through the inlet 15.

By opening control-valves 24, as is stated above, vaporous $SF_6$ flows from the reservoir 21 through the duct 22 into the vessel 17. The pressure is thus diminished. Consequently, a quantity of $SF_6$ has to be evaporated, which requires the supply of heat. This heat supply is obtained by connecting with the outlet 16 of the cooler 7 a duct 30, which is at 33 in thermal contact with the reservoir 21. Since the heat absorbed in the cooler 7 is considerably greater than the heat required for the evaporation of $SF_6$ in the reservoir 21, there is no risk of freezing of the coolant in the duct 30. The temperature and hence the pressure of $SF_6$ in the reservoir 21 will be quite uniform. The vapor pressure of $SF_6$ at temperatures above 0° C. is always sufficiently high to maintain a flow of $SF_6$ vapor to the vessel 17, so that no additional pumping means are required for this purpose. Between the control-cocks 24 and the liquid separator 28, a reduction valve 27 is provided in which the pressure of the vapor, which may be 30 atmospheres, is reduced to a constant pressure of, for example, 10 atmospheres. The outlet nozzles 25 have such a passage that the pressure difference between this value of 10 atmospheres and the pressure in the reaction vessel 17, produces such a rate of flow of $SF_6$ in the outlet piece that the metal melt cannot penetrate into the nozzles and the $SF_6$ will not attack them. The supplied flow of $SF_6$ can be controlled by opening or closing one or more of the cocks 24.

In order to prevent any liquid $SF_6$ carried along by the vapor from getting into the reduction valve 27, the duct 22 includes a liquid separator 28. The reduction valve 27 and the liquid separator 28 are prevented from becoming colder than the reservoir 21, which may result in condensation of $SF_6$ vapour in the reduction valve and in the liquid separator, by establishing a thermal contact between the coolant duct at 31 and 32 and the reduction valve and the liquid separator.

The coolant leaving the duct 30 at 34 may be fed back to the supply 15 of the cooler 7 so that a closed cooling system is formed. The coolant has then to be in thermal contact with the surroundings or with cooling water, because the evaporation of $SF_6$ requires less heat than the heat absorbed in the cooler by the coolant, so that the redundant heat has to be conducted away. The cooling system may alternately be of the open type, in which the coolant is supplied at 15 and conducted away from the device at 34.

In this way a device is obtained in which the $SF_6$ evaporation heat is no longer withdrawn from the surroundings so that there is no longer any risk of ice deposition on the heat exchange faces, while a quite uniform temperature and pressure of $SF_6$ are ensured.

FIG. 2 shows schematically a device, formed by a hot-gas engine, for converting heat energy into mechanical energy, in which the parts already shown in FIG. 1 are designated by the same reference numerals. In contrast to the device FIG. 1 this device comprises two reservoirs 41 and 61 storing liquid $SF_6$ as an oxydizing agent. With these reservoirs communicate ducts 42 and 62 respectively, including liquid separators 48 and 68 respectively, reduction valves 47 and 67 respectively and buffer vessels 46 and 66 respectively. These ducts open out at the other ends via control-cocks 44 and 64 respectively and outlet nozzles 45 and 65 respectively in the vessel 17, the $SF_6$ flow through said ducts being controllable by means of the control-cocks 44 and 64. With the coolant outlet 16 now communicate two ducts 50 and 70, which are in thermal contact 51 and 71 respectively with the reduction valves 47 and 67 respectively and at 52 and 72 respectively with the liquid separators 48 and 68 respectively and at 53 and 73 respectively with the reservoirs 41 and 61 respectively. The device comprises furthermore a reservoir 80 containing an inert gas, which can be supplied through ducts 81 and 82 including control-valves 83 and 84, to the ducts 62 and 42. This flow of inert gas permits of preventing the liquid metal from penetrating into the ducts 62 and 42 with a low rate of flow of $SF_6$ into the vessel 17. The supplied inert gas can be conducted through the bypass valve 85 and the pump 86 back to the reservoir 80.

Although for the sake of clarity the drawing shows that each of the supply ducts 42 and 62 respectively communicates through only one control-cock 44 and 64 respectively with only one outlet nozzle 45 and 65 respectively, it will be obvious that anyone of these supply ducts may communicate with a plurality of outlet pieces, there being provided a control-cock either between each outlet piece and the supply duct concerned or the outlet pieces associated with a supply duct being arranged in groups, each group then communicating through a control-cock with the supply duct. It is thus possible to control the $SF_6$ flow from each oxydizing agent reservoir by the selection of the number of opened control-cocks. By this control of the $SF_6$ supply from each of the reservoirs 41 and 61 and of a corresponding heat-supply to said reservoirs the centre of gravity of the assembly may be kept stationary in operation or be displaced at will.

The drawing shows only two embodiments of the present device. It will be obvious that a great number of structural variants thereof are possible without passing beyond the idea of the invention.

What is claimed is:

1. A device for converting heat energy into mechanical energy, particularly a hot-gas engine comprising at least one space of lower average temperature, in which a working medium can be compressed, and at least one space of higher average temperature, communicating with the former and allowing the working medium to expand, the connection between each pair of said spaces including a heat exchanger, preferably a regenerator, through which the working medium can flow to and fro, absorbing heat on its path from the compression space to the expansion space and giving off heat in the reverse direction, while a cooler having a coolant inlet and outlet is provided for withdrawing heat from the working medium contained in that portion of the device which is located on the side of said heat exchanger facing the compression space and a heating system is provided to supply heat to the working medium contained in that portion of the device which is located on the side of said heat exchanger facing the expansion space, said heating system comprising at least one reaction vessel containing a metal or metal mixtures which is liquid at the operational temperature and at least one reservoir containing a liquefied oxydizing agent capable of reacting chemically with the liquid in the reaction vessel while developing heat so that the reaction products are solid and/or liquid at the temperature and pressure prevailing in the reaction vessel, said reservoir communicating through at least one supply duct with the reaction vessel, there being provided a control-member for the regulated supply of oxydizing agent to the reaction vessel, characterized in that the coolant outlet duct of the cooler communicates with at least one duct, to which at least part of the coolant can be supplied and which is in thermal contact with the reservoir containing the liquefied oxydizing agent, the latter being chosen so that at the coolant temperature it has a vapour pressure exceeding the pressure in the reaction vessel.

2. A device as claimed in claim 1 characterized in that each of the supply ducts communicating with the oxydizing agent reservoir includes a reduction valve and a liquid separator located between said valve and the reservoir concerned, each of said ducts traversed by coolant prior to its thermal contact with the oxydizing agent reservoir concerned being in thermal contact with the associated reduction valve and the liquid separator.

3. In a device for converting heat energy into mechanical energy, particularly a hot-gas engine having a compression space and an expansion space of relatively lower and higher average temperatures respectively with corresponding means for compressing and expanding a working medium therein, and a connection between said spaces including a heat exchanger for transferring heat from a heating system to the working medium in the expansion space, a regenerator through which the working medium flows reciprocally between said spaces, and a cooler having a coolant inlet and outlet, provided for withdrawing heat from the working medium contained in the compression space, the improvement in combination therewith comprising a heating system including a reaction vessel, a metal or metal mixture reactant material heatable to a liquid state in the vessel, a reservoir containing an oxidizing agent, a supply duct for flowing said oxidizing agent from the reservoir to the vessel and for producing an exothermic reaction herein, control means for regulating the flow in said supply duct, and coolant duct means for flowing liquid coolant from the cooler outlet to the reservoir and thereby providing heat from the coolant to the oxidizing agent in the reservoir for ensuring a vapour pressure therein at least exceeding the pressure in the reaction vessel.

4. Apparatus according to claim 3 wherein said oxidizing agent is in a liquid and vapour state within the reservoir, and flows to the reaction vessel as a vapor.

5. Apparatus according to claim 4 further comprising, intermediate the reservoir and the control means, means for separating any liquid oxidizing agent from the vapour oxidizing agent flowing to the reaction vessel.

6. Apparatus according to claim 5 wherein the coolant duct means is in thermal contact with at least one of the supply duct and the liquid separator elements for heating same to maintain the oxidizing agent in vapor state.

7. Apparatus according to claim 4 further comprising means in said reaction vessel for heating the reactant therein.

8. Apparatus according to claim 4 wherein the reactant is at least one of the metals Li, Na, K, Mg, Al, and Ca, and the oxidizing agent is a halogen or halide such as sulphur hexafluoride ($SF_6$).

9. Apparatus according to claim 4 wherein said control means includes a reduction valve for establishing the desired vapor pressure of the oxidizing agent, and a control cock for regulating the gas flow.

10. Apparatus according to claim 4 further comprising a second reservoir of inert gas and means communicating this gas to the supply duct leading the oxidizing agent into the reaction vessel, the inert gas preventing liquid metal in the reaction vessel from penetrating into the oxidizing agent supply duct.

* * * * *